United States Patent
Williams et al.

(10) Patent No.: US 6,370,607 B1
(45) Date of Patent: Apr. 9, 2002

(54) AUTOMATIC DISABLING OF INTERRUPTS UPON ENTRY INTO INTERRUPT SERVICE ROUTINE

(75) Inventors: Robert Alan Williams, Cupertino; Din-I Tsai, Fremont, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/289,949

(22) Filed: Apr. 13, 1999

(51) Int. Cl.$^7$ ............................................... G06F 13/24
(52) U.S. Cl. ...................................................... 710/262
(58) Field of Search ................... 710/260–269

(56) References Cited

U.S. PATENT DOCUMENTS

| | | | | |
|---|---|---|---|---|
| 3,643,229 A | * | 2/1972 | Stuebe et al. | 710/264 |
| 5,237,692 A | * | 8/1993 | Raasch et al. | 713/324 |
| 5,301,312 A | * | 4/1994 | Christopher, Jr. et al. | 714/32 |
| 5,701,494 A | * | 12/1997 | Satoh | 710/262 |
| 5,875,341 A | * | 2/1999 | Blank et al. | 710/260 |
| 5,905,913 A | * | 5/1999 | Garrett et al. | 710/49 |
| 5,920,258 A | * | 7/1999 | Kusyk et al. | 340/506 |
| 5,928,348 A | * | 7/1999 | Mukai et al. | 710/263 |
| 5,974,440 A | * | 10/1999 | Brooks et al. | 709/109 |
| 6,003,109 A | * | 12/1999 | Caldwell et al. | 710/262 |
| 6,112,274 A | * | 8/2000 | Goe et al. | 710/260 |

* cited by examiner

Primary Examiner—Sumati Lefkowitz

(57) ABSTRACT

A system for automatically resetting an interrupt output is provided in a network controller having an interrupt management block that asserts the interrupt output in response to interrupt events. The interrupt output may be asserted in a real time mode or in a batch mode. An interrupt register contains bits that represent various interrupt events. An interrupt control register has enable bits for enabling or disabling an interrupt in response to certain interrupt events represented in the interrupt register. Also, the interrupt control register contains an interrupt pin enable bit for enabling or disabling the interrupt output of the controller. In response to an interrupt enable command from a CPU, the interrupt pin enable bit is set to 1 to enable the activation of the interrupt output of the controller. In response to the activation of the interrupt output, the CPU performs read access to the interrupt register to read an interrupt event that caused the interrupt. When a read access to the interrupt register is detected, the interrupt pin enable bit in the interrupt control register is automatically reset to reset the interrupt output and prevent an internal interrupt request signal from activating the interrupt output.

6 Claims, 4 Drawing Sheets

AUTOMATIC DISABLING OF INTERRUPTS UPON ENTRY INTO INTERRUPT SERVICE ROUTINE

FIELD OF THE INVENTION

The present invention relates to data processing, and more specifically, to a system for automatic disabling of interrupts upon entry into an interrupt service routine.

BACKGROUND ART

In a network controller chip, interrupts to an external central processing unit (CPU) may be produced to direct the CPU's attention to various interrupt events associated with data transmission and reception. When certain interrupt events are detected, the controller activates its interrupt output to send an interrupt request to the CPU. Upon receiving the interrupt request, the CPU may perform an input/output (I/O) transfer operation to reset the controller's interrupt output.

However, high-speed communications networks may require a CPU to be interrupted at rates of 20,000–100,000 interrupts per second in response to hundreds various events. As each received interrupt requires the CPU to perform a separate I/O operation to disable the interrupt, substantial CPU's resources are wasted on interrupt disabling I/O operations.

Thus, in order to increase efficiency of a data communications system, it would be desirable to provide a circuit that automatically disables interrupts upon entry into an interrupt service routine.

DISCLOSURE OF THE INVENTION

Accordingly, the advantage of the present invention is in providing a circuit for automatically disabling interrupts upon entry into an interrupt service routine.

This and other advantages of the present invention are achieved at least in part by providing a data communications device controlled by a CPU and having an interrupt output for producing an interrupt request signal supplied to the CPU. The device comprises an interrupt register for storing interrupt bits representing interrupt events. An interrupt control register stores an interrupt output enable bit to enable the interrupt output when the interrupt output enable bit is in a first logic state, and to disable the interrupt output when the interrupt output enable bit is in a second logic state. An interrupt disabling circuit automatically sets the interrupt output enable bit into the second state when the CPU performs read access to the interrupt register after receiving the interrupt request signal.

The interrupt disabling circuit may be responsive to an interrupt register address signal decoded by an address decoder, and to a read signal indicating that the CPU performs a read operation. For example, an AND gate may be used for receiving the interrupt register address signal and the read signal and producing an interrupt register read signal indicating that the CPU performs read access to the interrupt register. The interrupt register read signal may be supplied to the interrupt control register for setting the interrupt output enable bit into the second state.

When the CPU issues an interrupt enable command, the interrupt output enable bit may be set into the first state to allow the interrupt output to be asserted. When the interrupt output enable bit is set into the second state, the interrupt output is deasserted.

An interrupt generating circuit may be provided for producing an internal interrupt request signal in response to interrupt events. When the interrupt output enable bit is in the second state the internal interrupt request signal is prevented from activating the interrupt output.

In addition to holding the interrupt output enable bit, the interrupt control register may store interrupt event masking bits for preventing the internal interrupt request signal from being produced in response to selected interrupt events.

In accordance with a method of the present invention, the following steps are carried out for automatically disabling interrupts upon entry into an interrupt service routine:

detecting an interrupt event, asserting an interrupt to a host in response to the interrupt event, and automatically deasserting the interrupt in response to a read operation performed by the host to read the detected interrupt event.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

The present invention will be described with the example of a network interface in a packet switched network, such as an Ethernet (IEEE 802.3) network. It will become apparent, however, that the present invention is applicable to any peripheral device in any data processing system.

Figure 1A:
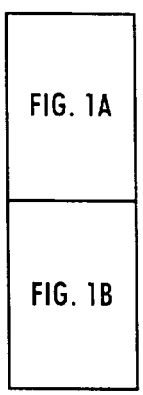
FIG. 1 is a block diagram illustrating an exemplary network interface, which may be used for implementing the present invention.
Figure 1A:
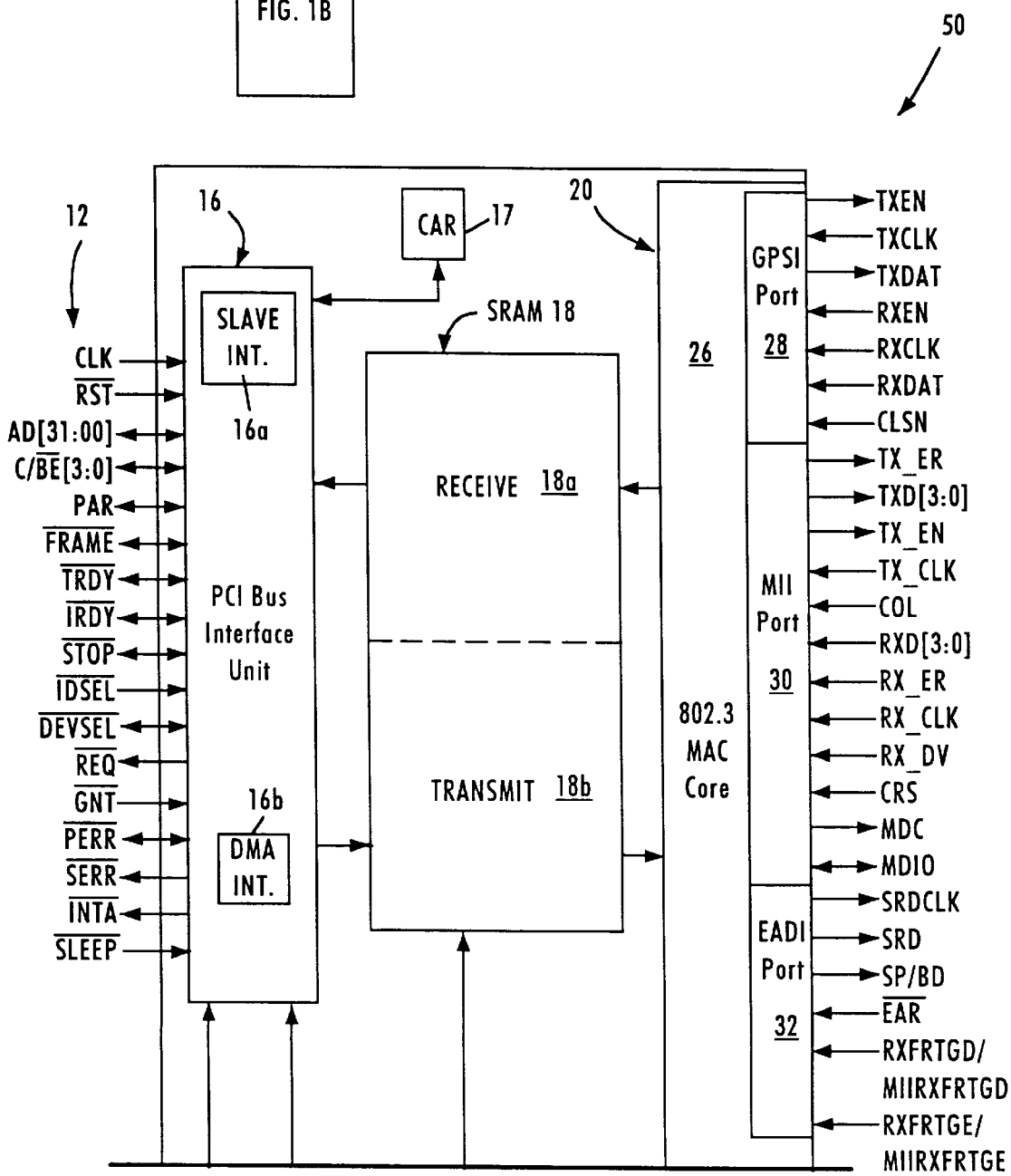
Figure 1B:
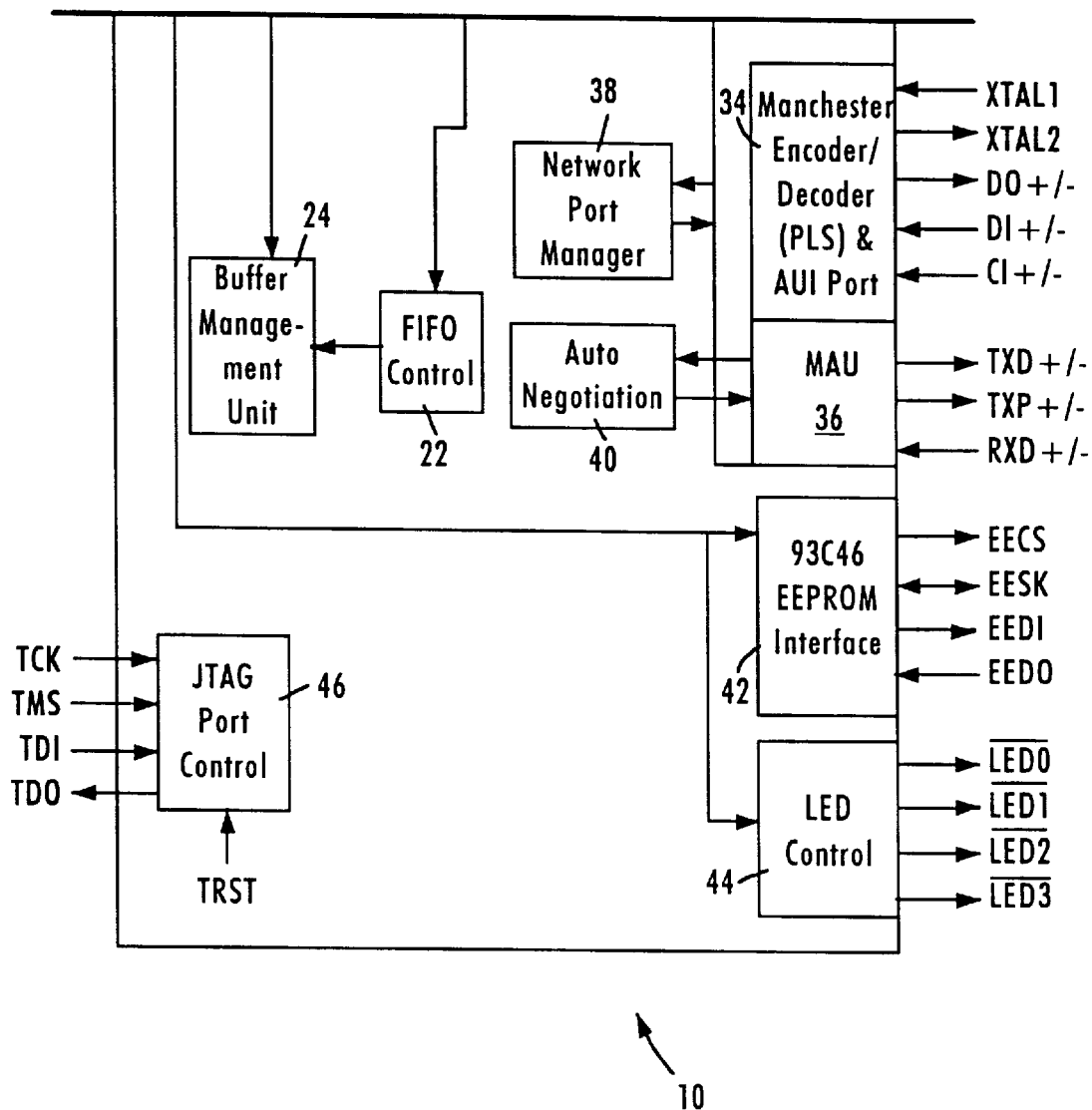

FIG. 1 is a block diagram of an exemplary network interface 10 that accesses the media of an Ethernet (ANSI/IEEE 802.3) network.

The network interface 10, preferably, a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 may provide an interface with an external CPU or other host via the PCI local bus. The PCI bus interface unit 16 may include a PCI slave interface 16a and a DMA interface 16b. The slave interface 16a manages PCI control and status information including reading and programming of the PCI status registers, and is configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

In accordance with the PCI local bus specification, revision 2.1, the PCI bus interface unit 16 has an interrupt request output INTA/ used for supplying the CPU or a host with an interrupt request signal. The network interface 10 produces the interrupt request signal to indicate that one or more of status flags are set. The status flags may represent such events as receive or transmit interrupt, system error, user interrupt, etc.

A Control and Register (CAR) block 17 contains registers that support interactions between the PCI bus interface 16 and other blocks of the network interface 10. The CAR block 17 has a register interface to the PCI bus interface 16 to allow read and write accesses to the registers. A decoder may be provided in the CAR block 17 to decode register address bits from the CPU to generate select signals for each of the registers. For example, the CAR block 17 may comprise a command register that decodes commands from the CPU and sends command signals to other blocks of the network interface 10. Also, the CAR block 17 contains an interrupt management block that manages the signaling of interrupt events and the activation of the interrupt pin to send interrupts to the CPU. The interrupt management block includes interrupt registers, counters and timers for controlling interrupts. Further, the CAR block 17 generates reset signals supplied to all other blocks of the interface 10, and provides input/output control.

The memory portion 18 includes a 16-bit SRAM implemented directly on the network interface chip 10. According to the disclosed embodiment, the SRAM 18 may be accessed in a random access manner under the control of a first in, first out (FIFO) control unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface portion 20 includes a media access control (MAC) core 26, a general purpose serial interface (GPSI) 28, a media independent interface (MII) 30 for connecting to an external 10 Mb/s or 100 Mb/s physical transceiver (PHY), an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking is performed in accordance with the IEEE 802.3protocols, and may include link and programming information exchange at the MII layer using a management data clock (MDC), and management data input/output (MDIO) paths defined in the IEEE 802.3standard.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface status registers (not shown). The network interface 10 also includes an IEEE 1149.1-compliant JTAG boundary scan test access port interface 36.

The EEPROM interface 42 connects to an EEPROM on either a network interface adapter card or the motherboard of the host computer via a serial interface link. The EEPROM (not shown in FIG. 1) will be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down.

As discussed above, the PCI bus interface unit 16 has an interrupt request output pin INTA/ for supplying an external CPU or other host with an interrupt request signal. An interrupt management block may be provided in the CAR block 17 for capturing various interrupt events that may occur in the network interface 10, and producing an interrupt request signal to report the interrupt events to the CPU. For example, the interrupt management block may handle various transmit and receive interrupt events. Among transmit interrupt events are transmit descriptor interrupts asserted when a transmit descriptor has been processed, free bytes interrupts asserted when a certain number of bytes become free in the transmit buffer 18b, transmit frame complete interrupts indicating that a transmit frame has been either successfully transmitted to the network or aborted due to error conditions, etc. Receive interrupt events include receive frame complete interrupts indicating that an entire receive frame is processed, receive out-of-descriptor interrupts asserted when the network adapter wants to transfer receive data to the system memory but no receive descriptor is available, etc.

Figure 2:
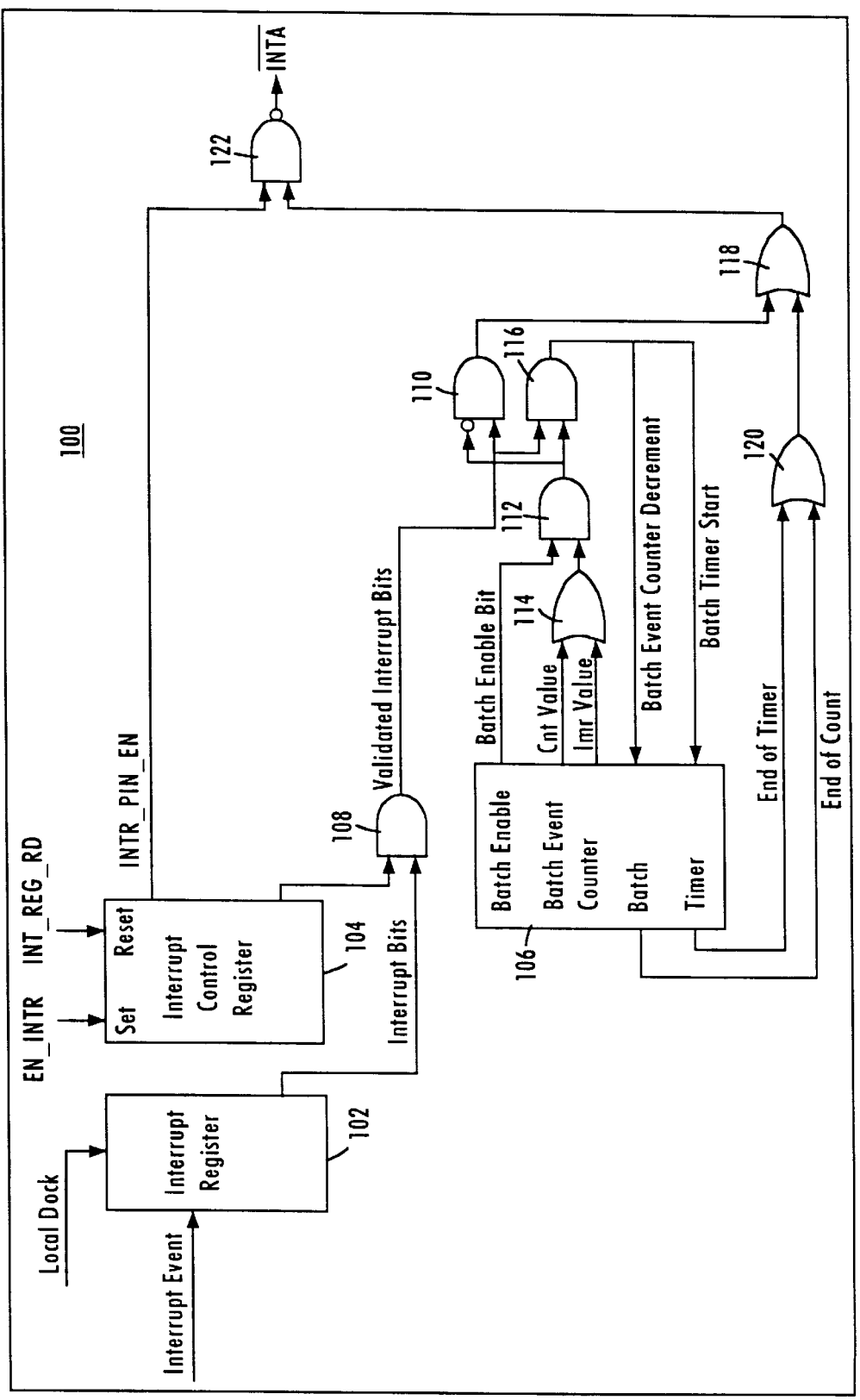
FIG. 2 is a block diagram of an interrupt management block of the present invention.

FIG. 2 illustrates a simplified block diagram of an interrupt management block 100 that may be provided in the CAR block 17 for handling interrupts. The interrupt management block 100 includes an interrupt register 102, an interrupt control register 104 and a batch register 106.

The interrupt register 102 contains interrupt bits that may be set to logic 1 in response to various interrupt events. A local clock signal is supplied to the interrupt register 102 to provide timing of its operations.

For example, the interrupt register 102 may contain such interrupt bits as a transmit descriptor interrupt bit, a transmit free byte interrupt bit, a transmit idle interrupt bit, a transmit descriptors returned interrupt bit, a transmit frame complete interrupt bit, a receive DMA optimum interrupt bit, a receive frame complete interrupt bit, a receive descriptor interrupt bit, a receive slave optimum interrupt bit, and a receive out-of-descriptor interrupt bit.

The transmit descriptor interrupt bit is set to 1 after a predetermined transmit descriptor is processed. The predetermined transmit descriptor may indicate, for example, that data in the transmit buffer 18b are ready for transmission. The transmit free bytes interrupt bit is set to 1 when a pre-programmed number of bytes becomes free in the transmit buffer 18b. The transmit idle interrupt bit is set to 1 when there are no more transmit buffers in a transmit descriptor list. The transmit descriptors returned interrupt bit is set to 1 after a predetermined number of transmit descriptors have been processed. The transmit frame complete interrupt bit is set to 1 after a transmit frame has been successfully transmitted to the network or aborted due to error conditions. The receive DMA optimum interrupt bit is set to 1 after a predetermined number of initial bytes of a receive frame has been transferred via the DMA interface 16b to the system memory. The receive frame complete interrupt bit is set to 1 after an entire receive frame has been processed. The receive descriptor interrupt bit is set to 1 after a predetermined receive descriptor has been processed. The receive slave optimum interrupt bit is set to 1 after a predetermined number of initial bytes of a receive frame has been receive. Finally, the receive out-of-descriptor interrupt bit is set to 1 when the network interface 10 wants to transfer receive data to the system memory but there is no receive descriptor available in the descriptor list.

The interrupt control register 104 is programmed by the user to mask interrupt events that do not need to be considered by the CPU. The interrupt control register 104 contains a control bit for each interrupt bit in the interrupt register 102. When the control bit is set to 1, the corresponding interrupt bit is enabled to activate an interrupt request signal on the INTA/ pin. When the control bit is reset, the interrupt event represented by the corresponding interrupt bit is excluded from CPU's consideration.

Also, the interrupt control register 104 contains an interrupt pin enable bit INTR_PIN_EN. This bit serves to enable or disable the activation of the interrupt request pin INTA/. When the CPU issues an enable interrupt command EN_INTR in the command register, the interrupt pin enable bit INTR_PIN_EN is set to 1. As a result, the activation of the interrupt request pin INTA/ is enabled. As discussed in more detail later, the interrupt pin enable bit INTR_PIN_EN is reset to 0 to disable the interrupt request pin INTA/ when the interrupt register 102 is read by the CPU.

The batch register 106 is programmed for batching interrupts enabled by the interrupt control register 104. The interrupt batching allows an enabled interrupt bit to activate an interrupt request signal on the INTA/ pin only when a predetermined number of interrupt events are detected, or a predetermined time period has elapsed since the last interrupt event was detected.

In addition to the registers, the interrupt management block 100 contains an AND gate 108 having inputs coupled to the interrupt register 102 and interrupt control register 104. The output of the AND gate 108 is connected to a non-inverting input of an AND-NOT gate 110. The inverting input of the AND-NOT gate 110 is coupled to the output of an AND gate 112 having a first input coupled to the batch register 106, and a second input coupled to the output of OR gate 114. Inputs of the OR gate 114 are connected to outputs of the batch register 106. The outputs of the AND gates 108 and 112 are coupled to inputs of an AND gate 116. The output of the AND gate 116 is supplied to inputs of the batch register 106. An OR gate 118 has a first input connected to the output of the AND gate 110, and a second input coupled to the output of an OR gate 120 connected to outputs of the batch register 106. The output of the OR gate 118 is coupled to a first input of an NAND gate 122. A second input of the NAND gate 122 is supplied with an interrupt pin enable signal INTR_PIN_EN from the interrupt control register 104. The output of the NAND gate 122 is supplied to the interrupt request pin INTA/ of the network interface 10.

The batch register 106 may contain three fields. The first field includes batch enable bits corresponding to the interrupt bits stored in the interrupt register. The batch enable bits indicate which interrupt bits should be batched. When a batch enable bit in the batch register 106 is set to 1, the batching of the corresponding interrupt bit is enabled.

The second field of the batch register 106 comprises a batch event counter programmed by the CPU to postpone an interrupt request signal in response to a selected interrupt event until the number of events corresponding to a batch event counter preset value is detected. The interrupt event, response to which should be postponed, is selected when the batch enable bit corresponding to the interrupt event is set to 1.

The third field of the batch register 106 contains a batch timer programmed by the CPU to define a delay time for delaying an interrupt request signal in response to a selected interrupt event. The interrupt event is selected when the corresponding batch enable bit is set to 1.

The batch event counter counts interrupt events selected for batching by the control bits in the interrupt control register 104 and the batch enable bits in the first field of the batch register 106. Each time when the selected interrupt event is detected by the batch mechanism, the batch event counter is decremented and produces a cnt value signal indicating a current count value. A batch event counter decrement signal supplied to the batch event counter represents an interrupt event selected for batching. When the batch event counter reaches its zero count, it produces an end of count signal. The batch event counter may be implemented by a synchronous counter controlled by the local clock signal.

The batch timer may be a counter decremented at a rate set by the local clock signal. A batch timer start signal is used to activate the batch timer. Each time when the batch timer is decremented, it produces a tmr value signal indicating a current timer value. When the batch timer 134 reaches its zero count, it produces an end of timer signal.

The batch event counter value cnt and the batch timer value tmr are supplied to the corresponding inputs of the OR gate 114. The end of count signal and the end of timer signal are provided to the corresponding inputs of the OR gate 120. The batch event counter decrement signal and the batch timer start signal are supplied from the output of the AND gate 116.

When an interrupt event occurs, the corresponding interrupt bit in the interrupt register is set to 1. This value is supplied to one input of the AND gate 108.

If the corresponding control bit in the interrupt control register 104 is set to 1, the AND gate 108 produces a validated interrupt bit at its output. If the control bit is equal to 0, then the interrupt bit does not pass to the output of the AND gate 108. As a result, the interrupt event is prevented from being considered by the CPU.

The validated interrupt bit is supplied to the non-inverting input of the AND-NOT gate 110, which has the inverted input coupled to the output of the AND gate 112. One input of the AND gate 112 is coupled to the batch register 106 to receive a batch enable bit. When the batch enable bit corresponding to an interrupt event is at a logic 0 level, the interrupt management block 100 handles the interrupt event in a real time mode of operation. In this mode, the output of the AND gate 112 is at a logic 0 level to allow a logic 1 signal representing the validated interrupt bit to pass to the output of the AND gate 110. As a result, an internal interrupt request signal is produced at the output of the OR gate 118. If the interrupt pin enable signal is set to 1, the NAND gate 122 produces a logic 0 level to activate the interrupt request pin INTA/.

When the batch enable signal corresponding to an interrupt event is set to logic 1, the interrupt event is handled in a batch mode. In response to the cnt value signal from the batch event counter or the tmr value signal from the batch timer 1, the AND gate 112 produces a logic 1 level at its output. As a result, the validated interrupt bit is prevented from passing to the output of the AND-NOT gate 110.

When a logic 1 level is produced at the output of the AND gate 112, the validated interrupt bit passes to the output of the AND gate 116 to produce the batch event counter decrement signal supplied to the batch event counter and the batch timer start signal supplied to the batch timer.

The batch event counter decrement signal causes the decrement of the batch event counter, which produces the cnt value signal indicating its current count. The batch event counter is preset to its initial value representing a predetermined number of interrupt events to be batched. When the batch event counter reaches its zero value, it produces the end of count signal supplied via the OR gate 120 to the OR gate 118 to generate an internal interrupt request signal at its output. If the interrupt pin enable signal is set to 1, the NAND gate 122 initiates an interrupt request signal at the interrupt request pin INTA/. Thus, an interrupt request signal may be postponed until the number of interrupt events processed in the batch mode reaches the predetermined number represented by the batch event counter preset value.

The batch timer start signal produced at the output of the AND gate 116 activates the batch timer, which is decremented at a rate set by the local clock signal. The batch timer is preset to its initial value representing a predetermined time interval. When the batch timer reaches its zero value, it produces the end of timer signal supplied via the OR gate 120 to the OR gate 118 to produce an internal interrupt request signal. If the interrupt pin enable signal is set to 1, the NAND gate 122 activates the interrupt request pin INTA/. Thus, the batch timer causes the interrupt request signal to be produced when a predetermined time interval has elapsed since the occurrence of an interrupt event processed in the batch mode.

After the interrupt request pin INTA/ is activated, an interrupt request signal via the PCI bus 12 is supplied to the CPU. In response, the CPU reads the interrupt register 102 to determine the interrupt event that caused the interrupt. An automatic interrupt disabling system of the present invention provides automatic disabling of the interrupt request pin INTA/ when the interrupt register 102 is read.

Figure 3:
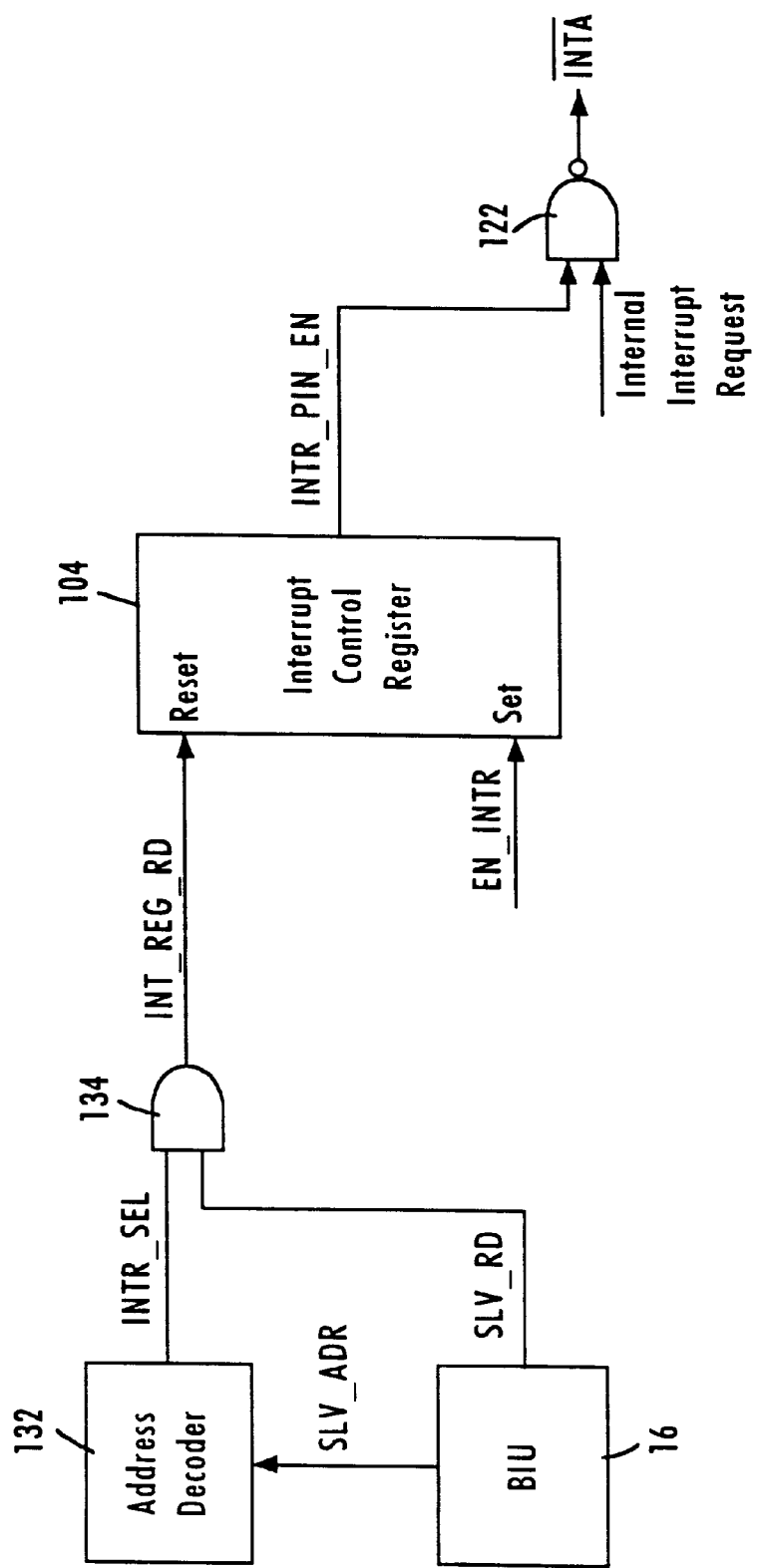
FIG. 3 is a block diagram illustrating automatic disabling of interrupts in accordance with the present invention.

Referring to FIG. 3, a decoder 132 provided in the CAR block 17 decodes a 6-bit register address signal SLV_ADDR supplied from the slave interface 16a of the PCI bus interface unit 16. When the register address signal corresponding to the interrupt register 102 is detected, the decoder 132 produces an interrupt register select signal INTR_SEL. To identify a read access operation of the CPU, the slave interface 16a generates a read signal SLV_RD. The interrupt register select signal INTR_SEL, together with the read signal SLV_RD, is supplied to an AND gate 134 that produces an interrupt register read signal INT_REG_RD provided to the interrupt control register 104.

As discussed above, the interrupt control register 104 contains an interrupt pin enable bit INTR_PIN_EN, which is set to 1 when the command decoder decodes the interrupt enable command EN_INTR. The interrupt pin enable bit INTR_PIN_EN is provided to the NAND gate 122 to enable the activation of the interrupt pin INTA/ in response to an internal interrupt request signal produced at the output of the OR gate 118.

When the interrupt register read signal INT_REG_RD is supplied to the interrupt control register 104, the interrupt pin enable bit INTR_PIN_EN is reset to 0. The NAND gate 122 is supplied with a logic 0 level to reset the interrupt request pin INTA/. Further, the NAND gate 122 prevents the interrupt request pin INTA/ from being activated if a new internal interrupt request signal is produced at the output of the OR gate 118 during an interrupt service procedure.

Thus, the network interface 10 automatically resets an interrupt when the CPU reads the interrupt register 102. As a result, the CPU is not required to perform a separate input/output operation to reset an interrupt after detecting an interrupt event that caused the interrupt.

There accordingly has been described a system for automatically resetting an interrupt output of a network controller. When interrupt events occur, the interrupt output may be asserted in a real time mode or in a batch mode. An interrupt register contains bits that represent various interrupt events. An interrupt control register has masking bits for enabling or disabling an interrupt in response to certain interrupt events represented in the interrupt register. Also, the interrupt control register contains an interrupt pin enable bit for enabling or disabling the interrupt output of the controller. In response to an interrupt enable command from a CPU, the interrupt pin enable bit is set to 1 to enable the activation of the interrupt output of the controller. In response to the activation of the interrupt output, the CPU performs a read access to the interrupt register to determine which type of interrupt event caused the interrupt. When a read access to the interrupt register is detected, the interrupt pin enable bit in the interrupt control register is automatically reset to reset the interrupt output and prevent an internal interrupt request signal from activating the interrupt output.

In this disclosure, there are shown and described only the preferred embodiments of the invention, but it is to be understood that the invention is capable of changes and modifications within the scope of the inventive concept as expressed herein.

What is claimed is:

1. A data processing device controlled by a CPU and comprising:

an interrupt output for producing an interrupt request signal supplied to said CPU, an interrupt register for storing interrupt bits representing interrupt events, an interrupt control register for storing an interrupt output enable bit to enable said interrupt output when said interrupt output enable bit is in a first logic state, and to disable said interrupt output when said interrupt output enable bit is in a second logic state, and an interrupt disabling circuit for automatically setting said interrupt output enable bit into said second state when said CPU performs read access to said interrupt register after receiving said interrupt request signal;

wherein said interrupt disabling circuit is responsive to an interrupt register address signal decoded by an address decoder;

wherein said interrupt disabling circuit is further responsive to a read signal indicating that the CPU performs a read operation;

wherein said interrupt disabling circuit comprises an AND gate for receiving said interrupt register address signal and said read signal and producing an interrupt register read signal indicating that the CPU performs read access to the interrupt register;

wherein said interrupt register read signal is supplied to said interrupt control register for setting said interrupt output enable bit into said second state.

2. The device of claim 1, wherein said CPU issues an interrupt enable command for setting said interrupt output enable bit into said first state.

3. The device of claim 1, wherein said interrupt request signal is deasserted when said interrupt output enable bit is set into said second state.

4. The device of claim 1, further comprising an interrupt generating circuit for producing an internal interrupt request signal in response to interrupt events.

5. The device of claim 4, wherein said internal interrupt request signal is prevented from activating said interrupt output when said interrupt output enable bit is in said second state.

6. The device of claim 4, wherein said interrupt control register is arranged for storing interrupt event masking bits for preventing said internal interrupt request signal from being produced in response to selected interrupt events.

* * * * *